June 16, 1953  R. R. LAYTE ET AL  2,642,188
REPLACEABLE FILTER UNIT CONSTRUCTION
Filed Nov. 16, 1951
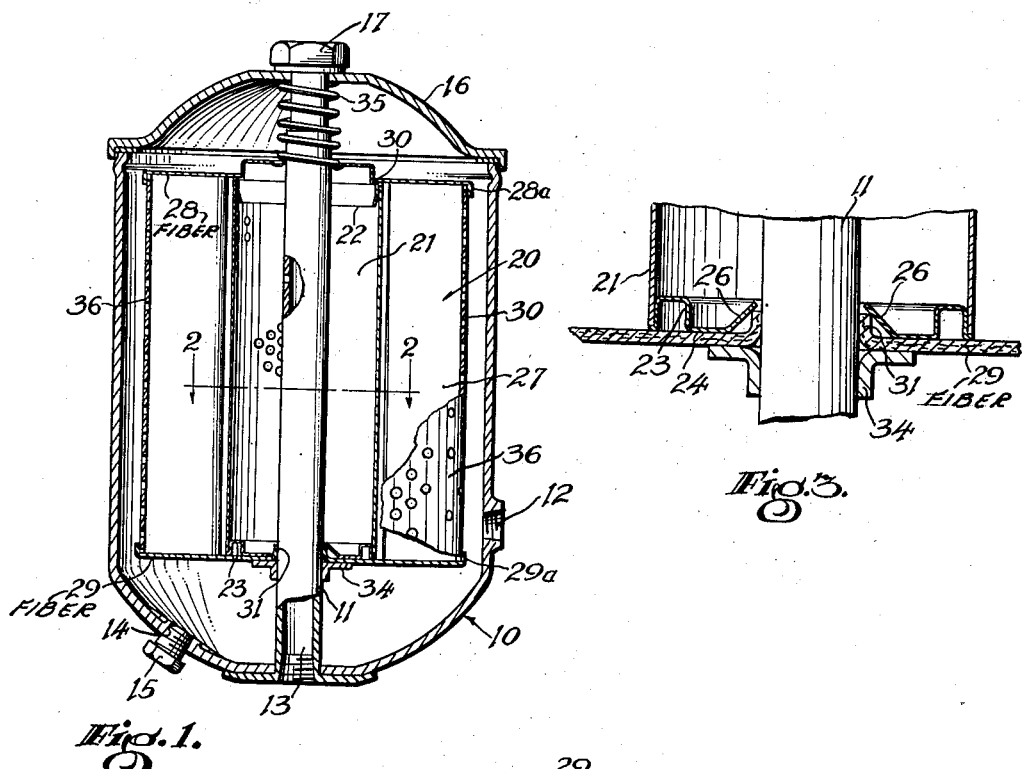
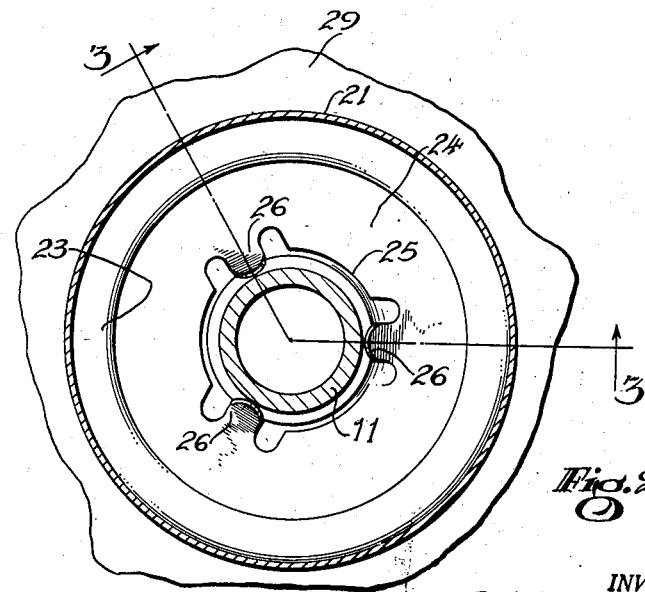
INVENTOR.
Ralph R. Layte
Albert Edward Bell
BY
Kenyon & Kenyon
ATTORNEYS Patented June 16, 1953

2,642,188

UNITED STATES PATENT OFFICE 2,642,188

REPLACEABLE FILTER UNIT CONSTRUCTION

Ralph R. Layte, Westfield, and Albert Edward Bell, Union, N. J., assignors to Purolator Products, Inc., Rahway, N. J., a corporation of Delaware Application November 16, 1951, Serial No. 256,718

9 Claims. (Cl. 210—169)

This invention relates to filters and more particularly to replaceable element type refill filter elements.

Refill filter elements of the type contemplated by this invention embody a substantially tubular filter body made of resin impregnated filter paper that is pleated and thereafter formed into a tubular body in which the pleats are directed substantially radially of the longitudinal axis. This pleated tubular body has had its ends closed off in any appropriate manner by end discs of metal or paper. Because of the thinness of the end edges of the pleats at their joints with the closing off end discs, difficulty in making an effective sealing bond has frequently been encountered. As a result, the element lacks necessary rigidity. Also, radial displacement of improperly bonded pleats frequently has occurred during shipment or in use with consequent leakage.

The invention herein contemplated has among its objects and features the elimination of improper bonds and the provision of rigid, rugged filter elements and the prevention of radial displacement of individual pleats even if defective bonding or loosening should occur.

Frequently, in the use of existing replaceable filter elements the user has neglected to remove the sealing washer required and usually placed on the central supporting tube in the filter casing to insure a seal at the bottom of the filter element. If such neglect is frequent enough, sufficient of the washers pile up on the supporting tube so that fresh replaceable filter elements thereafter placed thereon no longer fit properly in the filter casing.

Features and objects of the invention include the provision of washer eliminating structure in the replaceable filter element whereby the piling up of sealing washers will never occur.

In the structure embodying the invention, the sealing off end discs of the filter element are curled over the outer ends of the pleated filter body during bonding, thereby preventing all convolutions or pleats from extending beyond edges of the end discs at any time and thereby preventing leaks at such places. In addition, a better seal can be effected between the end discs and the pleats or convolutions because more of the cement is retained during and after bonding. In addition, greater strength results because of the substantially cup shape of the end discs which fit over the ends of the pleated filter body.

Other objects and novel features will become apparent from the following description and the accompanying drawing wherein:

Fig. 1 is a vertical section taken through a replaceable filter element embodying the invention shown in its position of use in a filter casing;

Fig. 2 is a transverse section taken along line 2—2 of Fig. 1 and viewed in the direction of the arrows; and Fig. 3 is a fragmentary vertical section taken along line 3—3 of Fig. 2 and viewed in the direction of the arrows.

Referring to the drawing and first to Fig. 1, 10 denotes generally a filter casing of conventional form which is mounted in an automotive vehicle. This casing 10 includes an upstanding centrally located vertical flow tube 11 which also serves as a vertical centering guide as will be hereinafter indicated.

The casing includes the inlet opening 12 and the outlet opening 13 as well as a drain opening 14, the latter being closed by a removable drain plug 15, and a removable cover 16 for the upper end of the casing 10. This cover 16 is secured removably in sealing relationship to the body of the casing 10 as by the bolt 17 which screws into the hollow threaded upper end of the center flow tube 11.

The removable or replaceable filter element which is designed for use with the casing 10 is denoted generally by the reference character 20. This element 20, as appears clearly from Fig. 1, includes a central perforated tubular member 21 which at its upper end is closed off by a reentrant tubular body 22 and through a central hole of which the central tube 11 may pass. The bottom end of the perforated tube 21 is closed off by a tube guide 23. This tube guide 23, in the embodiment shown, is a ring-like channel member and fits the lower end of the perforated tube 21 being appropriately secured thereto. The transverse face 24 of the member 23 is provided with a central opening 25 which has slightly larger diameter than the external diameter of the tube 11.

Three springy prongs 26 equally spaced about the circumference of the opening 25 project out of the plane of the transverse face 24 and act as centering guides for the member 23 relative to the tube 11 and hence of the bottom end of the perforated tubular member 21. These prongs 26 preferably are integral with member 23 and are of springy material to increase the effectiveness of their centering action.

A pleated body 27 of filtering material is mounted around the outer surface of the perforated tubular member 21 with the pleats extending radially from said last-named surface and with their fold edges lying parallel with the axis of the tubular member 21. The pleated filter body 27 consists preferably of filter paper impregnated with phenol formaldehyde resin solution as is well known in the art. End discs 28 and 29 preferably of similar resin impregnated paper are provided. These end discs are adapted to be mounted at opposite ends of the pleated filter element 27. Both initially are of larger diameter than the outer overall diameter of the tubular-shaped pleated body 27. The upper disc has a center hole 30 of fairly large dimensions while the lower end disc 29 has a center hole of substantially smaller diameter than the external diameter of the center tube 11. In applying these end discs to the body 27 the outer end edges of the pleated filter member 27 and the inner faces of the two discs 28 and 29 are first coated with a phenol formaldehyde resin cement. The two discs are then applied respectively to the upper and lower end edges of the pleats of the member 27 with their centers concentric with the axis of the center tube 11. Pressure and heat are then applied to firmly press the end discs against the end edges of the pleated body. Simultaneously the pressure is applied to the overlapping peripheral edge portions of the two discs 28 and 29 to bend these edges over the outer folds of the radially extending pleats of the filter body 27. These bent over edges form annular boundary rims 28a and 29a which confine the outer fold edges of the pleats and, because of the cement are firmly adhered thereto as well as to the upper and lower end edges of the pleats of the body 27. At the same time the overlapping inner edge of the lower end disc 29 is bent over to form the inturned sealing flange or rim 31. The inner diameter of this flange or rim 31 is approximately that of the outer diameter of the guide tube 11 and is adapted to form a tight sealing fit therewith. This sealing fit eliminates the necessity for the use of a separate sealing washer when the element 20 is mounted on tube 11.

The heat applied while the end discs 28 and 29 are being formed under pressure as described, acts to polymerize and set the resin cement and thereby to firmly bond the parts between which the resin cement lies. In the completed structure, the annular rims 28a and 29a provide cup-shape formation to the end discs 28 and 29, and, because they are firmly bonded to the folds of the pleats of the body 27 they effectively increase the rigidity and the strength of the bonded parts. Moreover the rims 28a and 29a act to maintain fixed positions of the radially extending pleats and to prevent any radial displacement thereof and thereby prevent leakage.

The completed filter unit 20 as just described is removably mountable in the casing 10 being mounted on the center guide post 11. This guide post is conveniently provided with a position fixing bracket or stop 34 fixed on tube 11 onto which the unit 20 is lowered. The spring prongs 26 of the tube guide 23 during lowering of the unit 20 on the tube 11 act as centering guides to prevent abnormal deformation of the inner annular flange or rim 31 which when it rests on the stop 34 acts as a sealing gasket or washer and eliminates the necessity for a separate washer at this location. After the unit 20 has been mounted in the casing as described the cover 16 is replaced after a compression spring 35 has been mounted on the tube 11 and the cover 16 is then secured in place by tightening of the bolt 17. In replacement the cover 16 is removed and the used unit 20 replaced by a fresh one. Inasmuch as no separate gasket is needed at the location of the stop 34 the accumulation of sealing washers on the post 11 due to neglect of the user is eliminated.

In the embodiment shown, an external perforated wrapper or element body 36 surrounds the outer folds of the body or element pack 27. The upper and lower edges of this wrapper fall short of the upper and lower edges of the element pack 27 and are adhesively secured to the outer folds of the pleats of pack 27. These outer or upper and lower edges of the wrapper 36 underlie the lower edges of the turned down rims 28a and 29a but do not extend the full depth of these rims so that the latter are actually bonded to the outer folds of the pleats of pack 27 as well as the upper edges thereof and also to the upper and lower edges of the wrapper 36. The use of wrapper 36 is optional and it can be omitted if desired. If omitted, the entire width of the rims 28a and 29a is adhered to the outer folds of the pleats of pack 27.

While specific embodiments of the invention have been disclosed, variations in structure detail within the scope of the claims are possible and are contemplated. There is no intention, therefore, of limitation to the exact details shown and described.

What is claimed is:

1. In a replaceable filter element, a pleated body of filtering material having its pleats extending radially of its axis, end discs adhesively secured to the opposite ends of said pleated body, said end discs having bent-over edges defining retaining rims fitting over the outer folds of the pleats, springy guide means independent of both said end discs and adjacent one of said end discs, said latter end disc having a central opening provided with a bent-over, inwardly extending, completely annular rim acting as a sealing ring, and said springy guide means being secured inwardly of the opening of said latter end disc and adjacent thereto.

2. In a replaceable filter element, a pleated body of filtering material having its pleats extending radially of its axis, end discs of the same material as the filter body adhesively secured to the opposite ends of said pleated body, said end discs having bent-over edges defining retaining rims adhesively secured to the outer folds of the pleats, guide means independent of both said end discs and secured in a fixed position relative thereto and adjacent one of said end discs, said latter end disc having a central opening provided with a bent-over, inwardly extending, completely annular rim acting as a sealing ring, and said guide means including springy guide fingers.

3. The replaceable filter element of claim 2 wherein said guide fingers are equi-spaced and integral portions of said guide means.

4. In a replaceable filter element, a tubular perforated member, a pleated body of filtering material arranged about the tubular member with its pleats extending radially thereof and its folds extending parallel therewith, end discs of the same material as the filter body adhesively secured to the opposite ends of said pleated body, said end discs having bent-over edges defining annular rims adhesively secured to the outer folds of the pleats, and guide means including a ring-like member having a central opening, said ring-like member being secured to the tubular perforated member adjacent one of said end discs, and spring guides with fingers on said ring-like member arranged about said opening, that one of said end discs adjacent said ring-like member having a central opening provided with a bent-over, turned-in completely annular rim acting as sealing ring.

5. The replaceable filter element of claim 4, in which said spring guides are equi-spaced and integral with said ring-like member.

6. In combination, a filter casing having a central guide tube and a replaceable filter element mounted in said casing on said tube, said replaceable filter element comprising a pleated body of filtering material having its pleats extending radially of said axis and its folds parallel therewith, end discs adhesively secured to opposite ends of said pleated body, said end discs having bent-over edges defining retaining rims fitting over the outer folds of the pleats, guide means independent of both said end discs and secured in a fixed position relative thereto and adjacent one of said end discs, said guide means including spring guide fingers engaging said central guide tube adjacent said one of said end discs, said latter end disc having a central opening through which said central guide tube extends and a bent-over inwardly extending, completely annular rim at said opening, said rim being integral with said latter end disc and engaging said central guide tube and acting as a sealing ring.

7. The combination of claim 6 wherein said guide means includes a ring-like member having the spring guide fingers extending therefrom.

8. The combination of claim 7 wherein said guide fingers are equi-spaced and integral with said ring-like member.

9. The combination of claim 6 wherein said replaceable filter element includes a perforated tube about which said pleated body is positioned, and wherein said guide means includes a ring-like member attached to said perforated tube, said ring-like member having the spring guide fingers extending therefrom and which fingers engage said central guide tube.

RALPH R. LAYTE.
ALBERT EDWARD BELL.

References Cited in the file of this patent

UNITED STATES PATENTS

| Number | Name | Date |
| --- | --- | --- |
| 2,313,307 | Wilkinson | Mar. 9, 1943 |
| 2,395,301 | Sloan | Feb. 19, 1946 |
| 2,522,975 | Voorhees | Sept. 19, 1950 |
| 2,569,243 | Kovacs | Sept. 25, 1951 |

FOREIGN PATENTS

| Number | Country | Date |
| --- | --- | --- |
| 501,667 | Great Britain | Mar. 3, 1939 |